United States Patent Office 3,223,472
Patented Dec. 14, 1965

3,223,472
PROCESS FOR IMPROVING THE TINCTORIAL CHARACTERISTICS OF FIBERS OBTAINED FROM OLEFIN POLYMERS
Avito Monaci and Paolo Lazzari, both of Terni, Italy, assignors to Montecatini Società Generale per l'Industria Mineraria e Chimica, Milan, Italy
No Drawing. Filed Dec. 13, 1961, Ser. No. 159,145
Claims priority, application Italy, Dec. 15, 1960, 21,527/60
6 Claims. (Cl. 8—115.5)

The present invention relates to a process for improving the tinctorial characteristics of the fibers obtained by spinning of mixes containing at least one crystalline olefin polymer, prepared with the aid of stereospecific catalysts, and basic nitrogen compounds.

Processes for making the fibers, obtained by the extrusion of mixes containing at least one crystalline polyolefin and basic nitrogen compounds, more dye receptive, are known. Such a process comprising subjecting the fibers to the action of di-epoxy compounds, such as ethyleneglycol diglycidylether, 4,4′-dioxy diphenyldimethyl methane and di-epoxy butane, is already known.

We have now found that a treatment, such as a contacting with alkylene oxides, of textile fibers, obtained from crystalline polyolefins prepared with stereospecific catalysts, particularly isotactic polypropylene, said crystalline polyolefins being modified by the addition of a basic nitrogen compound which functions as a tinctorial modifier, causes an improvement in the tinctorial characteristics of these fibers.

It is therefore an object of the present invention to provide a process for rendering fibers, obtained from mixes of polyolefins and basic nitrogen-containing compounds, more dye receptive.

Other objects and advantages of the invention will become apparent from the following description and examples.

This treatment of the fiber, according to the present invention, is generally carried out in aqueous solution of the alkylene oxide at temperatures between room temperature and 150° C. more particularly between 50° and 120° C., while using a concentration of alkylene oxide in water varying from 0.1 to 25% by weight, more particularly from 1 to 10%, and employing treatment times varying from a few seconds (i.e., 2 or more seconds) to 2–3 hours.

As the alkylene oxides, ethylene oxide, propylene oxide and butylene oxide have been found particularly suitable in the process of the present invention.

Polyolefin materials which may be treated according to the present invention in addition to polypropylene include at least one polymer of a higher alpha-olefin of the formula $CH_2=CHR$, wherein R is a hydrocarbon radical, such as alkyl, cycloalkyl and phenyl, especially crystalline polyolefins such as butene-1, pentene-1, hexene-1, styrene, 4-methylpentene-1 etc.

These polyolefin polymers are obtained in a known manner using the stereospecific catalysts of G. Natta et al. such as those disclosed in British Patent 810,023.

The application of the alkylene oxides, according to the present invention, may be carried out before and/or after the stretching of the fibers.

The treatment of the fibers with alkylene oxides, besides preventing the elimination of the basic nitrogen-containing tinctorial modifier, which loss would lead to a decrease in the dyeability of the fibers, also increases the receptivity of the fibers to dyes, such as, acid dyes, metallized dyes, chrome dyes, vat dyes, plastosoluble dyes, etc.

The dyes fastness of fibers treated according to the invention also are substantially improved.

The instant treatment is particularly applicable to the fibers consisting essentially of crystalline polyolefins prepared with stereospecific catalysts, particularly isotactic polypropylene, and basic nitrogen compounds.

As examples of such nitrogen compounds are crystalline polyvinylpyridines (prepared according to applicant's U.S. patent application Ser. No. 46,391/60); basic epichlorohydrin condensation products (prepared according to U.S. patent applications Ser. No. 30,732/60 and No. 124,346/60); dihalo derivatives-diamine condensation products (prepared according to applicants' U.S. patent application Ser. No. 83,141/60); polyimines (prepared according to applicants' U.S. patent application Ser. No. 702,430) and like basic nitrogen-containing compounds which are suitable for use in admixture with polyolefins.

The following examples are given to illustrate the present invention without limiting its scope.

All the values are given by weight unless otherwise indicated.

U.S. Patent No. 2,882,263 defines "isotactic macromolecules" as macromolecules having substantially isotactic structure, and "isotactic polymers" as polymers consisting of the macromolecules having substantially isotactic structure.

The following working examples exemplify the treatment of polypropylene fibers. As is known in the art, subsequent to the discoveries of Natta et al., the presence of a residue from the boiling n-heptane extraction is an indication of the presence of isotactic macromolecules. The meaning and significance of the term "isotactic" is well known to the present state of the art, as shown by U.S. Patent No. 2,882,263.

*Example 1*

A yarn is prepared by extrusion of a mix consisting essentially of 95% by weight of crystalline isotactic polypropylene ($[\eta]=1.35$, as determined in tetrahydronaphthalene at 135° C.; ash content=0.12%, residue after boiling heptane extraction=93.9%) and 5% of poly-2-vinylpyridine ($[\eta]=0.35$, as determined in dimethylformamide at 30° C., melting point=189° C).

The mix is spun in a melt-spinning device under the following conditions:

Screw temperature _____ 175° C.
Head temperature _____ 185° C.
Spinneret temperature _____ 185° C.
Spinneret type _____ 40/0.5×10 mm.
Maximum pressure _____ 50 kg./cm.$^2$
Winding-up speed _____ 380 m./min.

The fibers are then stretched in the presence of steam at 120° C. with a stretching ratio of 1:5.
The serimetric characteristics of the stretched yarn are as follows:

Tenacity _____g./den__ 3.8
Elongation _____percent__ 28

The yarn after stretching is treated with an aqueous solution of ethylene oxide having a concentration of 1.5% by weight, in an autoclave at 100° C. for 1 hour, while using a fiber/bath ratio of 1:100. The yarn is dried and subjected to a treatment with sulfuric acid. Upon dyeing the fibers thus treated, highly intense colors are obtained using the dyes (listed below). The dyeing is carried out for 1 hour at the boiling point with a fiber/bath ratio of 1:40 and using 5% of dye, calculated on the fiber.

The dyeing with acid and metallized dyes is carried out in the presence of 3% ammonic acetate and of 1% of a surfactant (condensation product of ethylene oxide with an alkylphenol), calculated on the fiber.

In order to exhaust the bath, 2% of a 10% acetic acid solution, calculated on the fiber, are added after boiling same bath for 30′. The dyeing with plastosoluble dyes are carried out in the presence of 2% surfactant, calculated on the fiber.

Solid yellow 2G (acid dye)
Wool red B (acid dye)
Alizarine green G (acid dye)
Alizarine blue BV (acid dye)
Acid black JVS (acid dye)
Lanasyn red 2GL (metallized dye)
Lanasyn brown GRL (metallized dye)

The colors, obtained with said dyes, have a fastness to rubbing and washing of 5 (determined according to the International Fastness Code).

Example 2

A yarn is prepared by extrusion of a mix consisting essentially of 95% by weight of crystalline isotactic polypropylene ($[\eta]=1.35$, as determined in tetrahydronaphthalene at 135° C.; ash content 0.12%; residue after boiling heptane extraction =93.9) and 5% of a hexamethylenediamine-dichloroethane condensate alkylated with lauryl chloride.

The mix is spun in a melt-spinning device under the following conditions:

Screw temperature _____ 185° C.
Head temperature _____ 195° C.
Spinneret temperature _____ 195° C.
Spinneret type _____ 40/0.5×10 mm.
Maximum pressure _____ 50 kg./cm.²
Winding-up speed _____ 300 m./min.

The fibers are stretched in the presence of steam at 120° C. with a stretching ratio of 1:5.

The serimetric characteristics of the stretched yarn are as follows:

Tenacity _____ g./den__ 3.5
Elongation _____ percent__ 25

The yarn after stretching is treated with an aqueous solution of ethylene oxide with a concentration of 1.5% by weight in an autoclave at 100° C. for 1 hour, using a fiber/bath ratio of 1:100.

The yarn is dried and treated with sulfuric acid. Upon dyeing the thus treated fibers with the dyes listed below, very intense colors are obtained. The dyeing is carried out for 1 hour at the boiling point with a fiber/bath ratio of 1:40 and using 5% of dye calculated on the fiber.

Solid light yellow 2G (acid dye)
Wool red B (acid dye)
Alizarine green G (acid dye)
Alizarine blue BV (acid dye)
Acid black JVS (acid dye)
Lanasyn red 2GL (metallized dye)
Lanasyn brown GRL (metallized dye)
Lanasyn pure green 2GL (metallized dye)

The colors, obtained with said dyes, have a fastness to rubbing and washing of 5 (determined according to the International Fastness Code).

Example 3

A yarn is prepared by extrusion of a mix consisting essentially of 95% of crystalline isotactic polypropylene ($[\eta]=1.35$, as determined in tetrahydronaphthalene at 135° C.; ash content 0.12%; residue after boiling heptane extraction=93.9) and 5% of an octadecylamine-epichlorohydrin-piperazine condensate. The mix is spun in a melt spinning device under the following conditions:

Screw temperature _____ 185° C.
Head temperature _____ 190° C.
Spinneret temperature _____ 190° C.
Spinneret type _____ 40/0.5×10 mm.
Maximum pressure _____ 50 kg./cm.²
Winding-up speed _____ 300 m./min.

The fibers are stretched in the presence of steam at 120° C. with a stretching ratio of 1:5.

The stretched yarn has the following serimetric characteristics:

Tenacity _____ g./den__ 3.7
Elongation _____ percent__ 22

The yarn after stretching is treated with an aqueous ethylene oxide solution having a concentration of 1.5% by weight, in an autoclave at 100° C. for 1 hour, using a fiber-bath ratio of 1:100.

The yarn is dried and treated with sulfuric acid. Upon dyeing the fibers thus treated, very intense colors are obtained with the dyes listed below. The dyeing is conducted for 1 hour at the boiling point, with a fiber/bath ratio of 1/40 and using 5% of dye, calculated on the fiber.

Solid yellow 2G (acid dye)
Wool red B (acid dye)
Alizarine green G (acid dye)
Alizarine blue BV (acid dye)
Acid black JVS (acid dye)
Lanasyn red 2GL (metallized dye)
Lanasyn brown GRL (metallized dye)
Lanasyn pure green 2GL (metallized dye)

The colors, obtained with the said dyes, possess a fastness to rubbing and washing of 5 (determined according to the International Fastness Code).

Many variations and modifications can obviously be practiced without departing from the spirit of the present invention.

Having thus described the present invention, what we desire to secure and claim by Letters Patent is:

1. A process for improving the dye receptivity of fibers obtained by the melt extrusion of at least one crystalline alpha-polyolefin and a basic nitrogen compound which comprises treating the melt extruded fibers with a solution of an alkylene oxide.

2. A process according to claim 1, wherein the basic nitrogen compound is selected from the group consisting of polyvinyl pyridines, the basic nitrogen condensation products of epichlorohydrin, the condensation products of a diamine compound with a dihalogen derivative, and alkylated derivatives thereof.

3. A process according to claim 1, wherein the polyolefin is polypropylene consisting of macromolecules having substantially the isotactic structure.

4. A process for improving the dye receptivity of fibers obtained by the melt extrusion of at least one crystalline alpha-polyolefin and a basic nitrogen compound which comprises treating the melt extruded fibers with a solution of alkylene oxide in water having a concentration of from 0.1 to 25% by weight of the alkylene oxide, at a temperature of from about room temperature to 150° C.

5. A process for improving the dye receptivity of fibers obtained by the melt extrusion of at least one crystalline alpha-polyolefin and a basic nitrogen compound which comprises treating the melt extruded fiber swith a solution of alkylene oxide having a concentration of from 1 to 10% by weight of alkylene oxide, at a temperature of from about 50° C. to 120° C.

6. A process for improving the dye receptivity of fibers obtained by the melt extrusion of at least one crystalline alpha-polyolefin and a basic nitrogen compound which comprises treating the melt extruded fibers with a solution of ethylene oxide.

References Cited by the Examiner

UNITED STATES PATENTS

| | | | |
|---|---|---|---|
| 3,013,998 | 12/1961 | Battaglioli | 18—43 XR |
| 3,016,283 | 1/1962 | Schappel | 18—54 |
| 3,017,238 | 1/1962 | Levine et al. | 18—54 |
| 3,039,840 | 6/1962 | Sawaya | 8—55 |
| 3,151,928 | 10/1964 | Cappuccio et al. | 8—55 XR |

OTHER REFERENCES

Textile Chemicals and Auxiliaries, pages 365 to 367, by Speel and Schwarz, Reinhold Publishing Co., 1957.

WILLIAM D. MARTIN, *Primary Examiner.*

RICHARD D. NEVIUS, M. V. BRINDISI, *Examiners.*